United States Patent [19]

Iizuka

[11] Patent Number: 4,607,301

[45] Date of Patent: Aug. 19, 1986

[54] DOOR MECHANISM OF A CASSETTE INSERTION OPENING IN AN AUDIO DEVICE

[75] Inventor: Yukio Iizuka, Tokyo, Japan

[73] Assignee: Clarion Co., Ltd., Tokyo, Japan

[21] Appl. No.: 540,362

[22] Filed: Oct. 11, 1983

[30] Foreign Application Priority Data

Oct. 14, 1982 [JP] Japan .......................... 57-154500[U]

[51] Int. Cl.$^4$ .......................... G11B 1/00; G11B 23/02
[52] U.S. Cl. .................................. 360/93; 360/96.5; 360/137; 49/386
[58] Field of Search ................ 360/93, 134, 137, 96.5; 49/381; 232/44, 47; 242/199, 198, 200

[56] References Cited

U.S. PATENT DOCUMENTS 3,800,328  3/1974  Harlan et al. ..................... 360/137
4,533,966  8/1985  Kume ................................. 360/93 X

*Primary Examiner*—Robert L. Richardson
*Attorney, Agent, or Firm*—Russell E. Hattis; Stephen R. Arnold

[57] ABSTRACT

A door mechanism for a cassette insertion opening in an audio device comprises an inner door pivotally supported along one edge of the cassette insertion opening; an outer door pivotally supported along the opposite edge of the cassette insertion opening and having depressions formed along the edge remote from the pivotal axle and a packing member attached to the periphery of the inner face for forcible contact with the wall surrounding the cassette insertion opening; lock means consisting of lock arms engageable with the depressions of the outer door when the outer door is closed and unlocking arms actuated by the inner door when the inner door is fully opened, the lock means being always biased to the position for locking the outer door and being rotated to the unlocking position upon the actuation of the unlocking arms by the fully opened inner door and upon an operation of a door opening button provided on a front panel of the audio device, for example.

6 Claims, 4 Drawing Figures

DOOR MECHANISM OF A CASSETTE INSERTION OPENING IN AN AUDIO DEVICE

FIELD OF THE INVENTION

This invention relates to a door mechanism of a cassette insertion opening in a tape player, and more particularly to a door mechanism having double doors to improve hermetical sealing of the tape player so as to be suitable for use in a ship. etc.

BACKGROUND OF THE INVENTION

Cassette type audio devices are widely used as car stereos and so forth. A prior art door mechanism of a cassette insertion opening in such an audio device has a single dust door pivotally supported at the opening. Such a dust door is made from a plastic resin, aluminum or other metals and shuts the cassette insertion opening when a cassette is not inserted therethrough to keep the interior of the audio device away from dust. When a cassette is inserted into the audio device, the dust door pivots a little inward into the audio device and remains there while the tape is driven.

Such cassette type audio devices are also used in ships and boats. Particularly, they are today in a considerable demand for small size leisure boats.

The prior art door mechanism, however, seals the audio device merely when a cassette is not inserted and remains halfway opened when the cassette is inserted. Therefore, the door cannot fully protect the interior of the audio device against water, salt and so forth and is not suitable for use in ships and boats.

OBJECTS OF THE INVENTION

It is therefore an object of the invention to provide a door mechanism capable of closing the cassette insertion opening also when a cassette is inserted.

Another object of the invention is to provide a door mechanism particularly suitable for use in ships and boats.

SUMMARY OF THE INVENTION

To achieve the objects, the door mechanism according to the invention includes double doors disposed inside and outside the cassette insertion opening.

DETAILED DESCRIPTION OF THE PREFERRED EMBODIMENT

The invention will now be described in detail by way of a preferred embodiment shown in FIGS. 1 to 4.

Figure 1:
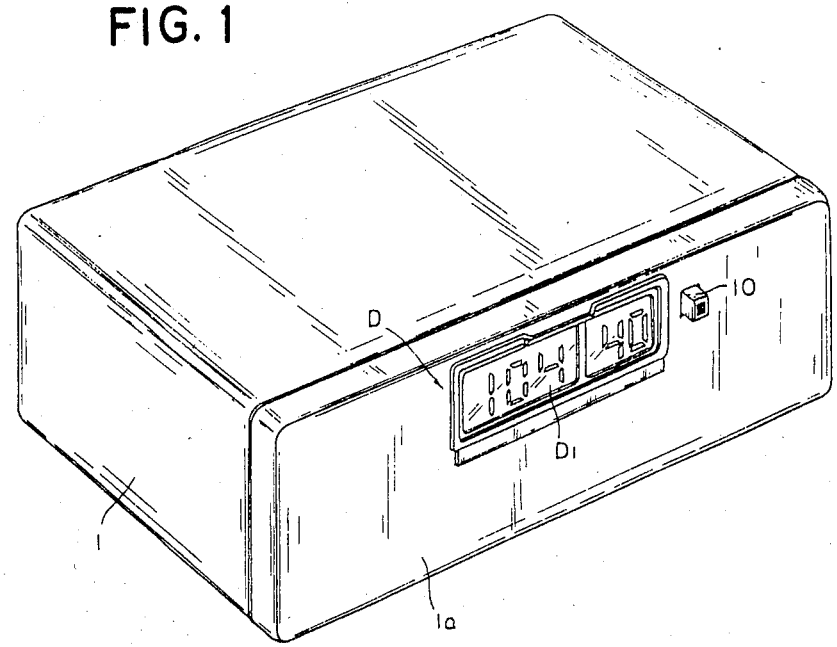
FIG. 1 is a perspective view showing a door mechanism embodying the invention wherein the cassette insertion opening is closed.
Figure 2:
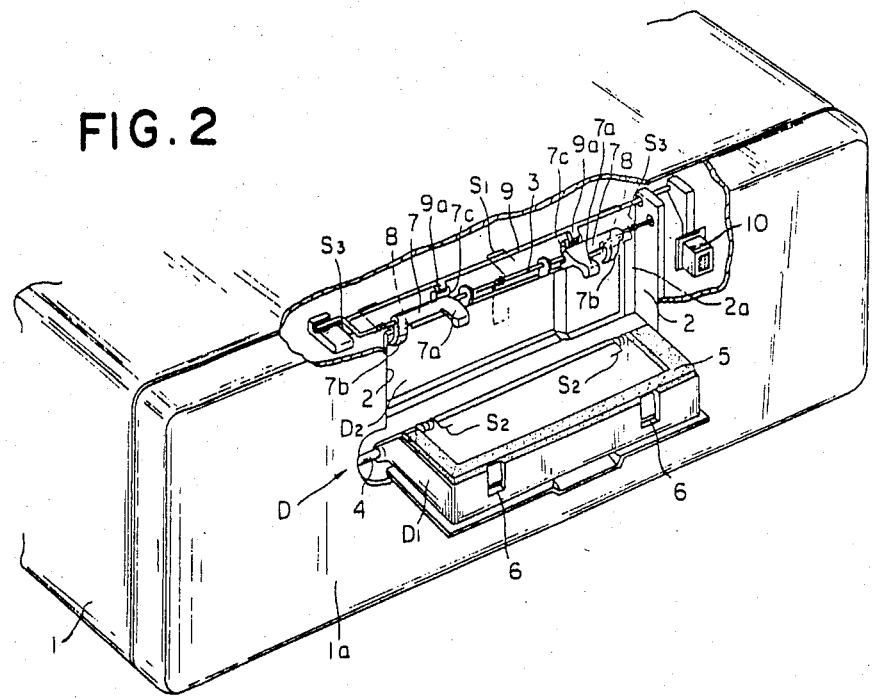
FIG. 2 is a partly broken, perspective view of the door mechanism wherein the outer door is opened and the interior of the audio device is exposed.

First, the construction will be explained. An audio device 1 which is a stereo combined with a radio set includes a front panel 1a. The front panel 1a is formed with a transversely-long, rectangular opening 2 for inserting a cassette therethrough. The opening 2 is provided with a door mechanism D hereunder described in detail. An inner door shaft 3 extends along the upper, inner edge of the opening 2 and pivotally supports an inner door $D_2$, while an outer door shaft 4 extends along the lower, inner edge of the opening 2 and pivotally supports an outer door $D_1$. The outer door $D_1$ has on the outer face thereof an indicator digitally indicating the radio frequency and is provided on the inner surface thereof with a packing member 5 made from sponge, for example. The packing member 5 forcibly contacts an outer wall 2a surrounding the cassette insertion opening 2 when the outer door $D_1$ is closed. The outer door $D_1$ is further formed along the upper edge thereof with depressions 6 for engagement with outer door lock arms which will be described later. An inner door wire spring $S_1$ is mounted on the inner door shaft 3 to always bias the inner door $D_2$ to a predetermined position where the inner door $D_2$ contacts the inner wall of the front panel 1a around the opening 2 to close the same. Outer door wire springs $S_2$ are mounted on the outer door shaft 4 to bias the outer door $D_1$ to its open position. The inner door shaft 3 pivotally supports door lock members 7 to lock the outer door $D_1$ at its closed position as shown in FIG. 1. Each said door lock member 7 consists of an outer door lock arm 7a projecting frontward of the audio device to lock the outer door $D_1$, an unlocking arm 7b downwardly projecting and curving in the form of an arc encircling an unlocking portion 8 formed in the inner door $D_2$, and a tongue 7c vertically extending from the rear end of the door lock member 7. The door lock members 7 are biased to their locking positions by wire springs $S_3$ also mounted on the inner door shaft 3.

Behind and in parallel with the inner door shaft 3 is pivotally disposed an outer door rotating shaft 9 for opening and closing the outer door $D_1$. One end (right end in FIG. 2) of the outer door rotating shaft 9 is connected to a button 10 for outer door opening operation. The outer door rotating shaft 9 has tongues 9a fixed thereto for engagement with the tongues 7c.

Next, the function of the door mechanism will be described hereunder.

In FIG. 1, the door mechanism D is closed. In this case, the packing member 5 forcibly contacts the outer wall 2a around the opening 2 and the outer door lock arms 7a engage the depressions 6 to lock the outer door $D_1$ at the closed position. Thus, the interior of the audio device 1 is protected against the outer air and water.

Figure 3:
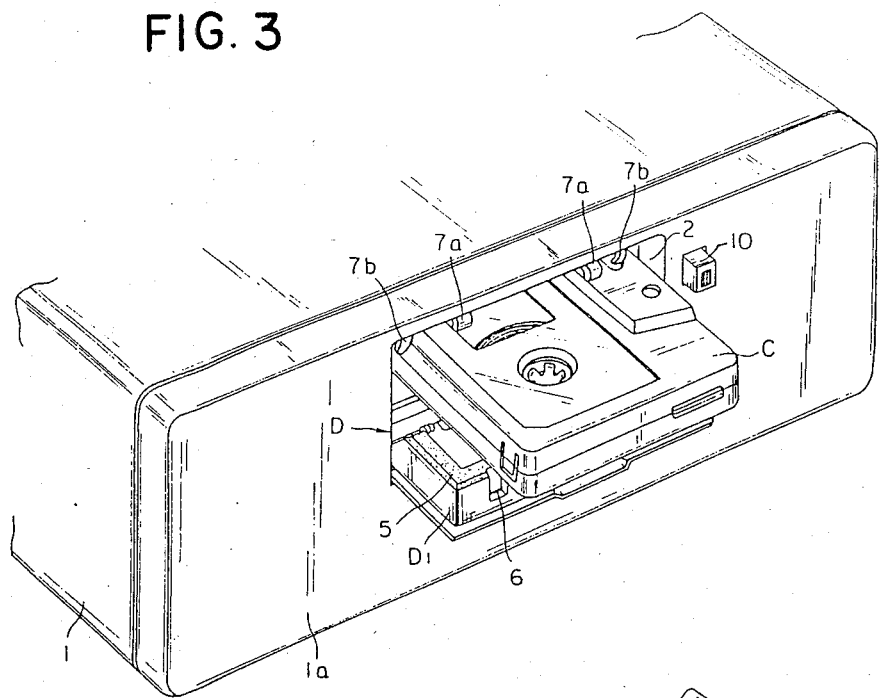
FIG. 3 is a perspective view of the door mechanism wherein a cassette is on the way to or from the audio device.
Figure 4:
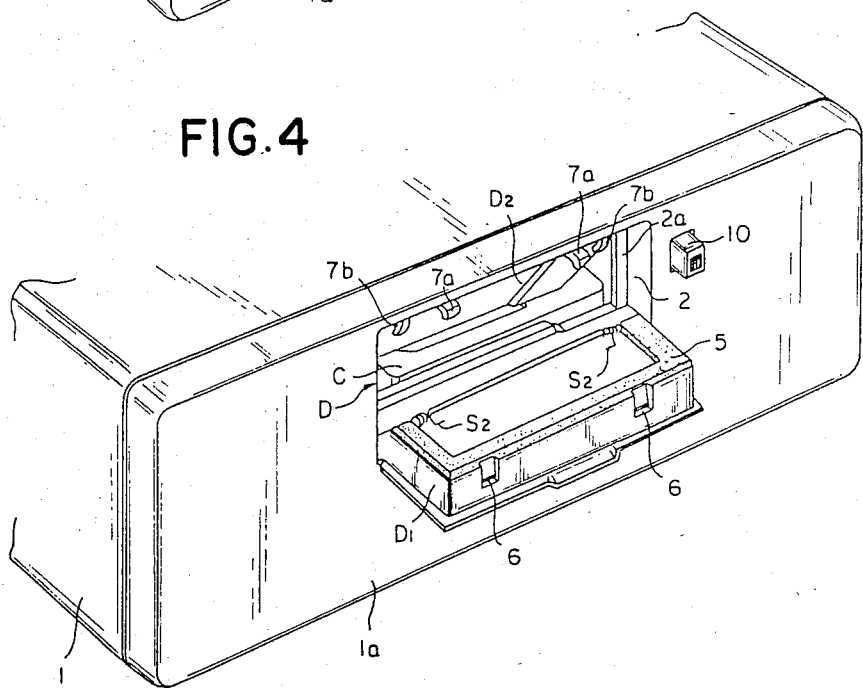
FIG. 4 is a perspective view of the door mechanism wherein a cassette is fully inserted in the audio device and the outer door is opened.

Now assume that the outer and inner doors $D_1$ and $D_2$ are closed as shown in FIG. 1 and a user is going to insert a cassette C. When the button 10 is pushed, the tongues 9a are rotated in the clockwise direction in FIG. 2 and rotate the door lock members 7 in the counterclock direction to unlock the outer door $D_1$. The outer door $D_1$ is then rotated by the wire spring $S_2$ to the open position of FIG. 2. Next, when the cassette C is inserted as shown in FIG. 3, the inner door $D_2$ is pushed by the forefront of the cassette C and is rotated rearward. After the cassette is manually pushed to a predetermined position, it is automatically conveyed to the full extent in the audio device by a known cassette loading mechanism and is shifted down to the play position (FIG. 4). In this case, the inner door $D_2$ remains halfway opened. When the outer door $D_1$ is thereafter manually rotated in the counterclock direction to the full extent, it is locked at the close position by the door lock members 7a engaging the depressions 6. Thus, the interior of the audio device 1 is protected against the outer air and water also while the cassette C is loaded.

Now assume that a user is going to eject the cassette C. When an eject button (not shown) is operated, tape drive motion is stopped and said cassette loading mechanism operates in the reverse order to said loading operation. Namely, the cassette C is first raised to the height for ejection and rotates the inner door $D_2$ in the clockwise (further inward) direction. Thereby, the unlocking portions 8 of the inner door $D_2$ push the unlocking arms 7b to rotate the door lock members 7 in the counterclock direction so that the lock arms 7a disengage from the depressions 6 in the same manner as operated by the button 10. Then, the outer door $D_1$ opens and the cassette C is concurrently automatically pushed back through the cassette insertion opening 2. After the cassette C is removed from the audio device, the outer door $D_1$ is manually rotated so as to close the opening 2 as shown in FIG. 1.

The indicator on the outer door $D_1$ may indicate any other data instead of the received frequency of the radio set in the audio device, or alternatively, the outer door $D_1$ may be in the form a plain plate without such an indicator.

As described above, according to the invention, the door mechanism consists of the inner door and the outer door, the outer door being provided at the rear surface thereof with the packing member for forcibly contacting the wall surface around the cassette insertion opening, the door mechanism further comprising door lock means to lock the outer door in the closed state, the door lock means being operated to unlock the outer door by a manual operation of the door opening button or by an automatic opening rotation of the inner door caused by an ejecting operation. Therefore, the door mechanism fully protects the interior of the audio device against dust, salt and water any time when a cassette is loaded or not. Thus, the door mechanism is greatly suited to audio devices for use in ships and boats. Further, since both the inner and outer doors are automatically opened upon ejection of a cassette, the door mechanism does not spoil the simple handling of the audio device.

I claim:

1. In a tape cassette player having a housing including a door mechanism for a cassette insertion opening, said mechanism comprising:
    an outer door pivotally supported outside said cassette insertion opening so as to open outwardly and close and seal against outwardly facing surfaces about said opening;
    an inner door parallel to said first door and pivotally supported inside over said cassette insertion opening, said inner door being pivotable inward into an open position which uncovers said opening upon insertion of a cassette through said opening;
    door lock means for locking said outer door when said outer door closes said cassette insertion opening; and
    door unlocking means for releasing said lock means to open said outer door.

2. The cassette player as set forth in claim 1 wherein said outer door is provided along the periphery of the inner face thereof with a sealing member.

3. In a tape cassette player housing provided with a cassette insertion aperture having outwardly and inwardly facing peripheral surfaces about the same and behind which is or is to be located insertion means for retracting a partially inserted cassette into the interior thereof and dropping said cassette into an engaging position upon vertically oriented reelbase drive spindles, and ejection means for raising said cassette from said engaging position and for ejecting said cassette at least partially through said insertion aperture, the improvement comprising:
    first door means for confrontingly covering said insertion aperture from the outside of said housing, said first door means being pivotally mounted to be movable between a closed aperture-covering position where it lies closely against said outwardly facing peripheral surface and an open position permitting direct insertion access to the interior of said housing;
    first biasing means for urging said first door means to said open position;
    latch means for releasably latching said first door means in said aperture-covering position against the force of said first biasing means; and
    release means for said latch means of said first door means for unlatching said latch means to effect opening of said first door means responsively to raising said cassette from said drive spindles by said ejection means.

4. The cassette player housing of claim 3 further comprising:
    second door means for confrontingly covering said insertion aperture from the interior of said housing and pivotally mounted to be movable between an aperture-covering position where it lies closely sealed against said inwardly facing peripheral surfaces and an open inwardly deployed position permitting direct access to the interior of said housing; and
    second biasing means for urging said second door means to said aperture-covering position, said second door means being disposed so that an inserted cassette engagingly disposed on said release spindles engagingly arrests the return of said second door means to an intermediate partially closed position, and so that raising said cassette moves said second door means from said intermediate position towards said open position, said latch release means being coupled to said second door means so as to unlatch said latch means when said second door means is issued from said intermediate position to said open position by raising said cassette.

5. The cassette player housing of claim 3 wherein said latch means includes at least one lever means pivotally mounted on lever pivot means and having a first arm, said first arm and said first door means being configured to lockingly engage when said first door means is closed and said lever means is rotated in a first or locking direction and to disengage when said lever means is rotated in a second opposite releasing direction, and resilient lever biasing means for urging said lever means in said locking direction, said lever means further including a second arm configured and disposed to contactingly engage said second door means to be rotated in said unlocking direction during movement of said second door means from said intermediate position to said open position thereof.

6. The cassette player housing of claim 3 further comprising weather sealing means for providing a seal at the interface of said first door means and outwardly facing peripheral surfaces around said insertion aperture when said first door means is in said aperture-covering position.

* * * * *